D. CLOW.
Fanning Mill.
No. 104.
Reissued Oct. 30, 1847.
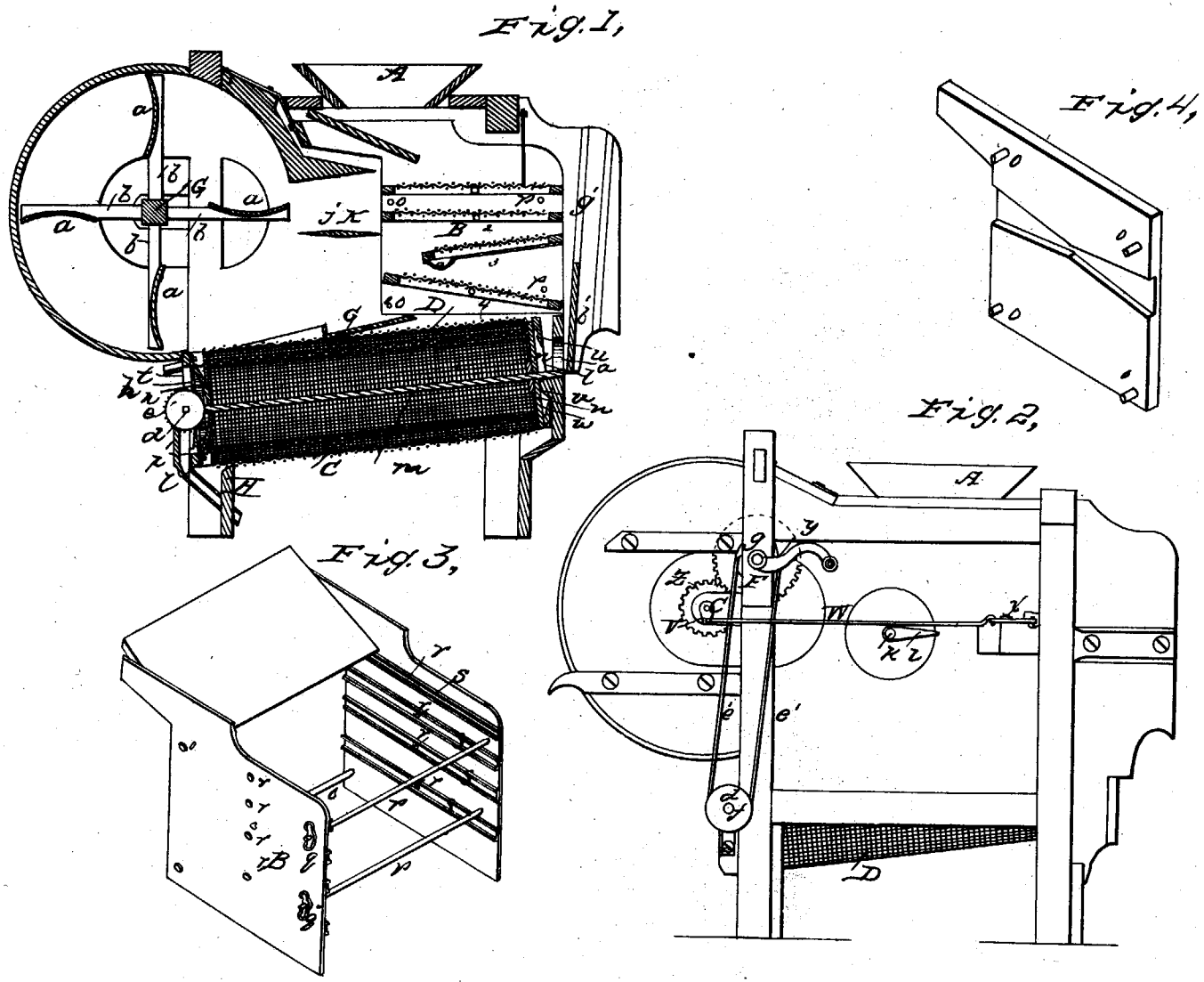
N. PETERS, Photo-Lithographer, Washington, D. C.

UNITED STATES PATENT OFFICE.

DANIEL CLOW, OF PORT BYRON, NEW YORK.

IMPROVEMENT IN WHEAT-FANS.

Specification forming part of Letters Patent No. 4,582, dated June 16, 1846; Reissue No. 104, dated October 30, 1847.

*To all whom it may concern:*

Be it known that I, DANIEL CLOW, of Port Byron, in the county of Cayuga and State of New York, have invented and added sundry Improvements to the Fanning-Mill, by the aid of which grain of different kinds can be thoroughly cleaned and separated from every foreign substance.

I denominate my invention "Clow's Combined Rotary and Vibratory Screen Fanning-Mill;" and I do hereby declare the following to be a full and exact description thereof, reference being had to the accompanying drawings, making a part of this specification.

Figure 1 is a vertical longitudinal section through my improved fanning-mill; Fig. 2, a side elevation of the same; Fig. 3, a perspective view of the vibrating shoe detached from the mill, and Fig. 4 is a perspective view of the side of the vibrating shoe constructed in a different manner.

Similar letters indicate like parts in all the figures.

The supporting-frame of my improved fanning-mill is constructed in the usual manner.

My first improvement consists in giving the face of the wings *a a* of the fanner a concave form, for the purpose of adding to the strength of the blast without increasing the number of revolutions of the fanner.

*b b* are the arms, and *c* is the shaft, of the fanner.

My second improvement is the introduction of a regulator, J, between the fan and the vibrating shoe B, for the purpose of guiding and directing the current of wind from the fan onto whichever screen in the vibrating shoe that may be desired in the cleaning of different kinds of seeds or grains. The whole blast may be thrown onto the upper or onto the lower screen, or the greater portion onto one or the other, as circumstances may require.

The regulator *j* is constructed of a plank having its edges beveled to a point.

*k* is the shaft or journal on which the regulator *j* is vibrated.

*l* is a lever for moving and indicating the position of the regulator.

My third improvement consists in the manner of constructing the shoe B, and so securing the screens 1 2 3 4 in the same that their position be easily changed and adjusted.

I generally construct the sides of the shoe of metallic plates, and connect them to each other by rods *o o* and *p p*.

On one end of the rods *p p*, I place screw-nuts *q q*.

To the inner surface of the sides of the shoe I secure adjustable metallic groove-plates *s s* by rivets *r r*, passing through their centers. The groove-plates *s s* receive the screens 1 2 3 4, which are firmly fastened in any desired position by the action of the screw-nuts *q q* on the rods *p p*, drawing the sides of the shoe closely against the screens. By this arrangement the screens can be placed in a horizontal position or at any angle of inclination with each other that may be desired in cleaning different kinds of seeds or grains, or for combining the vibratory screens with the double rotary screens.

When I construct the sides of the shoe of wood, I make the grooves for the reception of the screens of the form represented in Fig. 4—viz., at their centers they closely embrace the sides of the frames of the screens, and each way from this point they are enlarged—by which form I am enabled to place the screens in any position desired and firmly secure them by means of the screw-bolts *p p*, as in the other modification of the shoe, with metallic sides.

My fourth improvement consists in placing a double rotating cylindrical screen in the fanning-mill under the shoe B, extending in an inclining position from the rear to front of the mill. The double rotating screen consists of two cylindrical screens, C and D, placed concentrically the one within the other, secured to annular heads *t t*, which heads are secured to a shaft, *m*, by the arms *n n*. The grain is first acted upon by the vibrating screens 1 2 3 4 in the usual manner, and from these it is conducted into the rear or highest end of the inner rotating screen, D. The inner screen, D, is of a coarse, and the outer screen, C, of a fine, texture. The meshes of the inner screen, D, are of such a size that they will allow the grains of wheat or rye to pass through them onto the outer screen, C, and retain every coarser substance. The meshes in the outer screen, C, are just fine enough to retain the kernels of wheat or rye and allow the cockle and every smaller substance to pass through them as the screen is revolved. The rotary motion of the double screens and their inclined positions carry the grain forward on the screen C and discharge the same through the enlarged meshes or openings at its front end onto the front side of the division-board H, the same motion carrying forward the coarser substances and trash in the inner screen, D, and discharges them into the spout *i*, which conducts the same to the rear of the division-board H under the mill. The double cylindrical screen is revolved by a bevel cog-wheel, *e*, on a horizontal shaft, *d*, working into a bevel-wheel, *h*, on the shaft *m*. The shaft *d* is driven by a band, *e'*, connecting the pulley *f* on the same with the pulley *g* on the main driving-shaft E.

*c'* is a nut on the shaft *m*, for stretching the double screens C D. *y* is a crank on the driving-shaft E.

F is a cog-wheel on the driving-shaft E, working into and communicating motion to the cog-wheel *z* on the fan-shaft *c*.

*v* is a crank on the fan-shaft *c*, which communicates a vibratory movement to the shoe B through the connecting-rod *w* and elbow *x*, constructed in the usual manner.

*l* is a lever for operating the regulator *j* and indicating its position.

*b'* is a guide-board passing across the rear end of the mill, sliding in grooves *g'* in the sides of the same. The grain, after being acted upon while passing through and over the vibrating screens 1 2 3 4 in the shoe B, is discharged from the screen 4 into the space between the cross-board *h'* and the guide-board *b'*, and passes through the aperture *a'* in the cross-board *h'*, over the spout *d'*, into the cylindrical screen D.

On the rear annular head, *t*, of the double cylindrical screen there is a flange, *u*, projecting inward, which prevents the grain from falling out of the rear end of the same. When it is unnecessary to pass the grain through the double cylindrical screen, the vibrating screen 4 is inclined forward, which throws the grain onto the apron G, by which it is conducted to the front end of the mill.

Having thus fully described the construction and operation of my improvements to the fanning-mill, what I claim therein as new, and desire to secure by Letters Patent, is—

1. The adjustable groove-plates *s s*, for confining the screens to the sides of the shoe B. and, in combination therewith, the manner of securing the screens firmly in any desired position by the rods *p p* and screw-nuts *q q*, substantially in the manner and for the purpose herein set forth.

2. The arrangement of the vibrating and rotating screens with each other in such a manner that by tilting the screen 4 (or its equivalent) in one direction the vibrating screens will be brought into combination with the rotating screens, and by tilting the screen 4 in an opposite direction the vibrating screens will be disconnected from the rotating screens and brought into combination with the tail-board G, substantially as herein set forth.

DANIEL CLOW.

Witnesses:
JAMES CLOW.
ABM. CLOW.